United States Patent
Kataoka et al.

(10) Patent No.: US 10,262,478 B2
(45) Date of Patent: Apr. 16, 2019

(54) VEHICLE-DATA RECORDER

(71) Applicant: TOYOTA JIDOSHA KABUSHIKI KAISHA, Toyota-shi, Aichi-ken (JP)

(72) Inventors: Hiroaki Kataoka, Toyota (JP); Shintaro Iwa-Asa, Toyota (JP); Hiroshi Nakada, Toyota (JP); Tomoki Nagao, Nagoya (JP); Takashi Kojima, Seto (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/832,389

(22) Filed: Dec. 5, 2017

(65) Prior Publication Data
US 2018/0174380 A1   Jun. 21, 2018

(30) Foreign Application Priority Data
Dec. 21, 2016 (JP) ................. 2016-247837

(51) Int. Cl.
| | |
|---|---|
| *G07C 5/08* | (2006.01) |
| *G06K 9/00* | (2006.01) |
| *B62D 15/02* | (2006.01) |
| *B60W 40/072* | (2012.01) |

(Continued)

(52) U.S. Cl.
CPC .......... *G07C 5/085* (2013.01); *B62D 15/025* (2013.01); *B62D 15/029* (2013.01); *B62D 15/0265* (2013.01); *G06K 9/00798* (2013.01); *G06K 9/00805* (2013.01); *B60Q 1/0023* (2013.01); *B60W 30/12* (2013.01); *B60W 40/072* (2013.01); *G07C 5/0866* (2013.01)

(58) Field of Classification Search
None
See application file for complete search history.

(56) References Cited

U.S. PATENT DOCUMENTS

| | | | |
|---|---|---|---|
| 8,838,371 B2 * | 9/2014 | Sakai | G08G 1/16 |
| | | | 701/300 |
| 9,829,888 B2 * | 11/2017 | Reiff | B60W 30/12 |
| 9,834,185 B2 * | 12/2017 | Tanase | B60T 7/22 |

(Continued)

FOREIGN PATENT DOCUMENTS

| | | |
|---|---|---|
| JP | 2010-271999 A | 12/2010 |
| JP | 2013-073610 A | 4/2013 |

*Primary Examiner* — Chico A Foxx
(74) *Attorney, Agent, or Firm* — Oliff PLC

(57) ABSTRACT

A vehicle-data recorder records vehicle data into a storage when a recording condition is satisfied. The recording condition includes a condition that a steering-related value representing a state of a steering operation performed by a driver or a vehicle behavior caused by the steering operation is greater than or equal to a threshold value. The vehicle-data recorder includes: an object-information obtainer that obtains object information relating to an object in an area; and a threshold-value changer that changes the threshold value to a smaller value when a relative positional relationship between an own vehicle and the object located in the area and identified based on the obtained object information is a specific relationship in which it is estimated that a steering operation is to be performed in a direction in which the own vehicle avoids the object, than when the relative positional relationship is not the specific relationship.

8 Claims, 9 Drawing Sheets

(51) Int. Cl.
*B60Q 1/00* (2006.01)
*B60W 30/12* (2006.01)

(56) References Cited

U.S. PATENT DOCUMENTS

| | | | |
|---|---|---|---|
| 9,965,956 B2* | 5/2018 | Tsushima | G08G 1/16 |
| 2007/0091173 A1* | 4/2007 | Kade | B60W 50/14 |
| | | | 348/119 |
| 2007/0171121 A1* | 7/2007 | Munakata | G01S 13/931 |
| | | | 342/55 |
| 2010/0295668 A1* | 11/2010 | Kataoka | B62D 15/025 |
| | | | 340/435 |
| 2011/0137487 A1* | 6/2011 | Nishimaki | B60T 7/22 |
| | | | 701/1 |
| 2011/0304447 A1* | 12/2011 | Marumoto | G07C 5/085 |
| | | | 340/438 |
| 2012/0130595 A1* | 5/2012 | Hayakawa | B60W 30/12 |
| | | | 701/42 |
| 2012/0218093 A1* | 8/2012 | Yoshizawa | B60R 1/00 |
| | | | 340/435 |
| 2013/0063595 A1* | 3/2013 | Niem | B62D 15/025 |
| | | | 348/148 |
| 2013/0079990 A1* | 3/2013 | Fritsch | B62D 6/007 |
| | | | 701/41 |
| 2013/0238192 A1* | 9/2013 | Breu | G01S 13/726 |
| | | | 701/41 |
| 2013/0271607 A1* | 10/2013 | Takahashi | G01S 5/16 |
| | | | 348/148 |
| 2015/0009330 A1* | 1/2015 | Sobue | G08G 1/166 |
| | | | 348/148 |
| 2015/0321668 A1* | 11/2015 | Elwart | B60T 8/17557 |
| | | | 701/41 |
| 2016/0107565 A1* | 4/2016 | Pino Mendez | B60Q 1/46 |
| | | | 701/36 |
| 2016/0221549 A1* | 8/2016 | Tanase | B60T 7/22 |
| 2016/0325681 A1* | 11/2016 | Van Dan Elzen | |
| | | | H04N 5/23203 |
| 2017/0294120 A1* | 10/2017 | Ootsuji | B60K 28/066 |
| 2018/0086267 A1* | 3/2018 | Nix | B60R 1/002 |

* cited by examiner

VEHICLE-DATA RECORDER

CROSS REFERENCE TO RELATED APPLICATION

The present application claims priority from Japanese Patent Application No. 2016-247837, which was filed on Dec. 21, 2016, the disclosure of which is herein incorporated by reference in its entirety.

BACKGROUND

The following disclosure relates to a vehicle-data recorder configured to record vehicle data into a storage.

Patent Document 1 (Japanese Patent Application Publication No. 2010-271999) discloses a driving supporter configured to support driving to prevent a departure of a vehicle from a lane. In the driving supporter disclosed in Patent Document 1, in the case where there is a possibility of a departure of the vehicle from the lane, an electric steering device is controlled to apply steering torque to prompt a driver to perform a steering operation to prevent the departure of the vehicle from the lane. Patent Document 2 (Japanese Patent Application Publication No. 2013-73610) discloses a vehicle-data recorder configured to record vehicle data into a storage. The vehicle-data recorder disclosed in Patent Document 2, when a yaw rate of the vehicle is greater than or equal to a set value, vehicle data stored in a volatile memory is recorded into a non-volatile memory.

SUMMARY

Accordingly, an aspect of the disclosure relates to a vehicle-data recorder configured to record vehicle data into a storage in a case where there is an object located in an area and identified based on object information obtained by an object-information obtainer provided on an own vehicle.

The present vehicle-data recorder records vehicle data into a storage when a relative positional relationship between an own vehicle and an object located in an area and identified based on object information obtained by an object-information obtainer is a specific relationship. Examples of the specific relationship include: a relationship in which it is estimated that a steering operation in a direction in which the own vehicle avoids the object is to be performed; and a relationship in which it is estimated that the steering operation in the direction in which the own vehicle avoids the object is to be performed at a speed greater than or equal to a threshold value or with steering torque greater than or equal to a threshold value. Examples of the steering operation in the direction in which the own vehicle avoids the object include: a steering operation in a direction away from the object in a case where the object is present on a front lateral side of the own vehicle; and a steering operation for moving the own vehicle rightward or leftward to avoid the object in a case where the object is present in front of the own vehicle. In a case where the object having the specific relationship as described above is present, the present vehicle-data recorder records the vehicle data into the storage. That is, the present vehicle-data recorder can record, into the storage, the vehicle data obtained in the case where the object having the specific relationship is present. While at least the vehicle data is recorded into the storage, not only the vehicle data but also image data including the object located in the area and identified based on the object information obtained by the object-information obtainer may be recorded into the storage, for example. It is noted that Patent Document 2 has no description indicating that vehicle data is recorded when an object is detected. In the present vehicle-data recorder, a small amount of the vehicle data is recorded into the storage when compared with the case where the vehicle data is recorded when the object is detected. This configuration reduces a possibility of an amount of data exceeding a capacity in the storage, thereby more reliably recording the vehicle data into the storage in the case where the relative positional relationship between the object and the own vehicle is the specific relationship.

BRIEF DESCRIPTION OF THE DRAWINGS

The objects, features, advantages, and technical and industrial significance of the present disclosure will be better understood by reading the following detailed description of the embodiment, when considered in connection with the accompanying drawings, in which.

DETAILED DESCRIPTION OF THE EMBODIMENT

Hereinafter, there will be described one embodiment by reference to the drawings.

Figure 1:
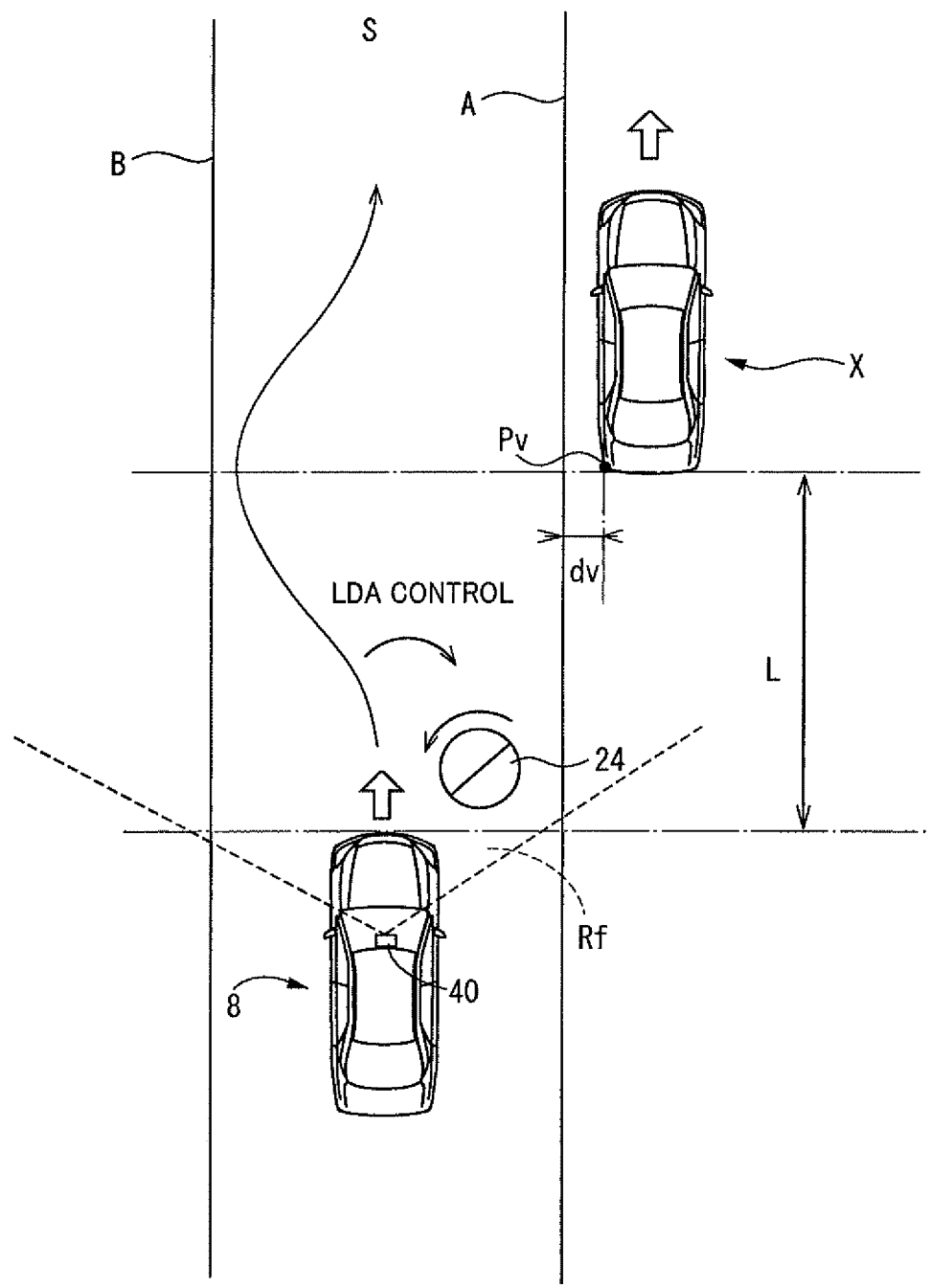
FIG. 1 is a view illustrating a relative positional relationship between an object and an own vehicle installed with a vehicle-data recorder according to one embodiment.
Figure 2:
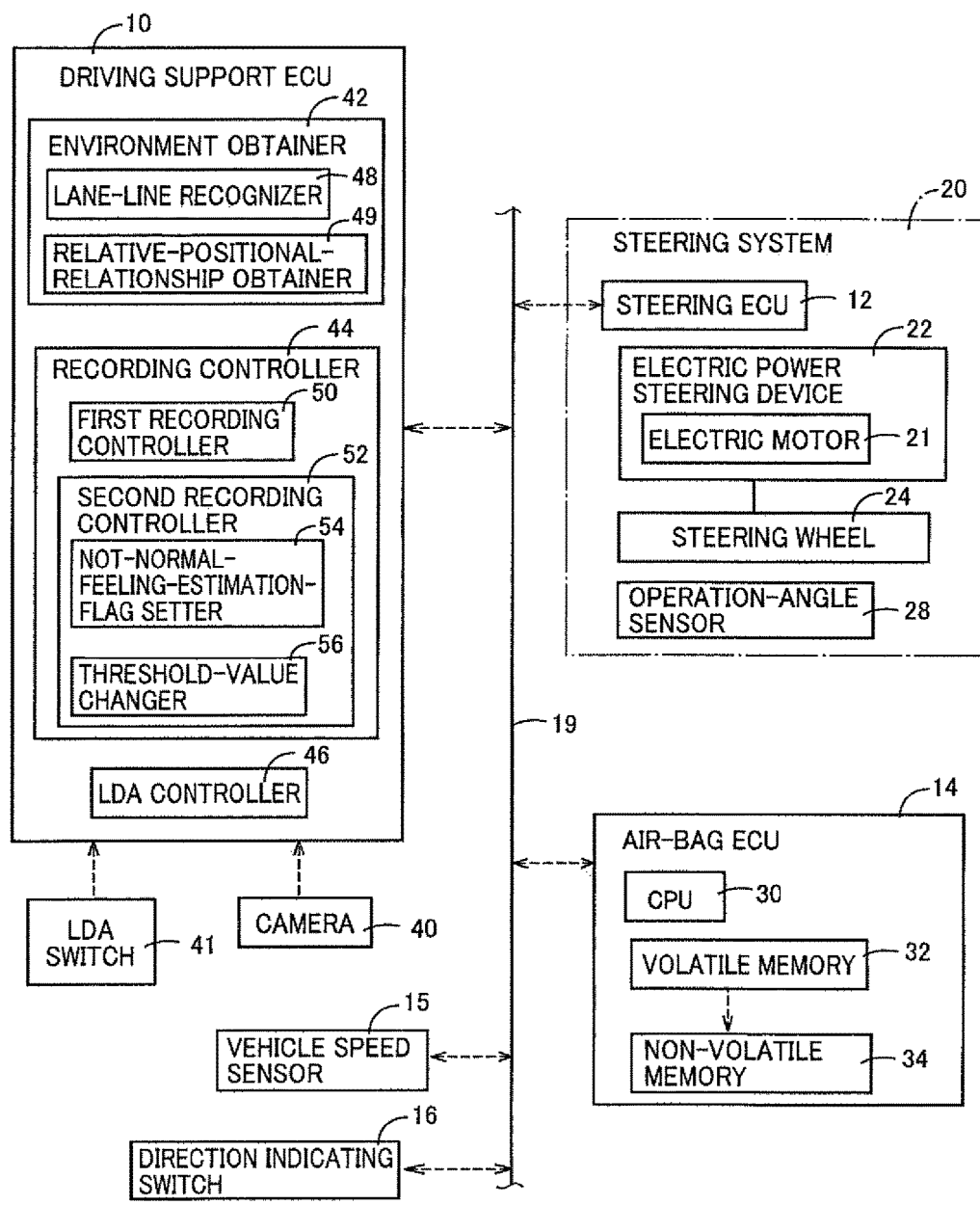
FIG. 2 is a block diagram conceptually illustrating the own vehicle.

A vehicle-data recorder according to the present embodiment is installed in an own vehicle 8 illustrated in FIG. 1. As illustrated in FIG. 2, the own vehicle 8 includes a driving support electric control unit (ECU) 10, a steering ECU 12, an air-bag ECU 14, a vehicle speed sensor 15, and a direction indicating switch 16. These devices are communicably connected to each other over a controller area network (CAN) 19. The vehicle speed sensor 15 detects a vehicle speed Vs based on wheel speeds of front left and right and rear left and right wheels of the own vehicle 8. The vehicle speed Vs is a running speed of the own vehicle 8.

The direction indicating switch 16 is operable by the driver and indicates a direction of travel of the own vehicle 8 (which corresponds to a direction of a steering operation) when the steering operation is performed.

The steering ECU 12 is an element of a steering system 20 and principally constituted by a computer including a central processing unit (CPU) as an executer, a storage, and an input/output device, not illustrated. The steering system 20 includes: an electric power steering device 22 including an electric motor 21; a steering wheel 24 as a steering operation member; and an operation-angle sensor 28 configured to detect an angle of operation of the steering wheel 24. Devices such as the electric motor 21 and the operation-angle sensor 28 are connected to the input/output device of the steering ECU 12.

The electric power steering device 22 is configured to turn steered road wheels by using (i) steering torque applied from a driver to a steering mechanism via the steering wheel 24 and (ii) steering torque applied from the electric motor 21 to the steering mechanism. The steering ECU 12 controls the electric motor 21 to control the steering torque applied to the steering mechanism. Examples of application of the steering torque to the steering mechanism include: application of the steering torque to the steering mechanism in the same direction as a direction of the steering operation performed by the driver; and application of the steering torque to the steering mechanism in a direction reverse to the direction of the steering operation performed by the driver.

The operation-angle sensor 28 is one example of a steering-related-value detector configured to detect a steering-related value. The operation-angle sensor 28 is configured to detect the angle of operation of the steering wheel 24. A position of the steering wheel 24 when the own vehicle 8 travels straight ahead is defined as a reference position. The operation-angle sensor 28 outputs a positive value as a rotation angle of the steering wheel 24 from the reference position in the right direction and outputs a negative value as a rotation angle of the steering wheel 24 from the reference position in the left direction. It is possible to determine that the steering wheel 24 is rotated in the right direction in the case where the detection value output from the operation-angle sensor 28 has increased (which case includes a case where an absolute value of the negative value output from the operation-angle sensor 28 has decreased). Also, it is possible to determine that the steering wheel 24 is rotated in the left direction in the case where the detection value output from the operation-angle sensor 28 has decreased (which case includes a case where the absolute value of the negative value output from the operation-angle sensor 28 has increased). In the present embodiment, when the steering wheel 24 is rotated in the right direction, a steering-direction flag Fs is set to the right (Fs=2), and when the steering wheel 24 is rotated in the left direction, the steering-direction flag Fs is set to the left (Fs=1). It is possible to obtain an operating speed as a speed of operation of the steering wheel 24 by obtaining a gradient of change in the rotation angle of the steering wheel 24 (i.e., the detection value output from the operation-angle sensor 28) with respect to a time.

The air-bag ECU 14 is principally constituted by a computer and configured to control operations of an air bag, not illustrated, for example. The air-bag ECU 14 includes a CPU 30, a volatile (transitory) memory 32, and a non-volatile (non-transitory) memory 34. The volatile memory 32 cannot store data when an ignition switch as a main switch of the own vehicle 8 is turned to OFF. Examples of the volatile memory 32 include: a buffer (e.g., a ring buffer) configured to temporarily store data such as vehicle data; and a random access memory (RAM). The non-volatile memory 34 is configured to keep storing data even when the ignition switch is turned to OFF. Examples of the non-volatile memory 34 include a flash memory, a hard disk, and an electrically erasable programmable read-only memory (EEPROM).

The data, such as the vehicle data, supplied via the CAN 19 is recorded into the volatile memory 32 in a cycle of a predetermined time. The volatile memory 32 has a predetermined area with a set capacity specific for the data such as the vehicle data, and data of an amount greater than or equal to the set capacity cannot be stored into the volatile memory 32. Thus, the vehicle data is overwritten with new vehicle data in the order from the oldest one to prevent the amount of data, such as the vehicle data, stored in the volatile memory 32 from exceeding the set capacity. Examples of the data such as the vehicle data include the vehicle data and image data obtained by a camera 40 which will be described below. Examples of the vehicle data include: driving data representing a driving situation of the driver; running data representing a running state of the own vehicle 8; and control data representing a state of control executed by the controllers of the own vehicle 8. Examples of the driving data include data representing the steering operation performed by the driver (e.g., the operation angle and the operating speed of the steering wheel 24 and the steering torque). Examples of the running data include a vehicle speed and a yaw rate. Examples of the control data include data representing processings of lane-departure-alert (LDA) control. It is noted that the volatile memory 32 may not store all the above-described data. For example, the vehicle data may be recorded into the volatile memory 32 without the image data being recorded.

When a recording requirement flag Fm is ON, the CPU 30 transfers the data such as the vehicle data from the volatile memory 32 to the non-volatile memory 34 and records the data into the non-volatile memory 34. That is, the data such as the vehicle data is stored into the non-volatile memory 34.

Figure 11:
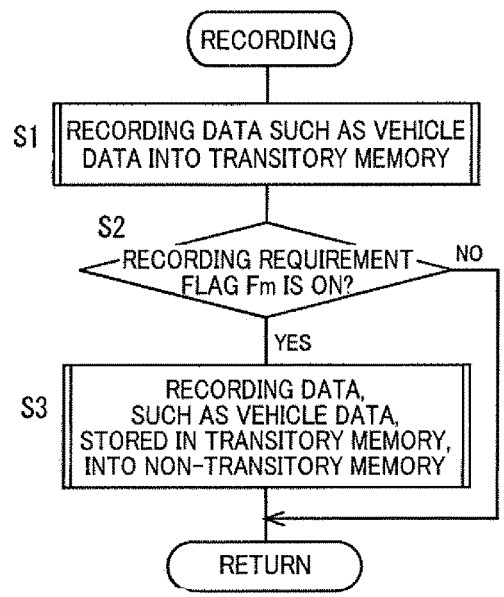
FIG. 11 is a flow chart illustrating a recording program stored in the storage of an air-bag ECU of the own vehicle.

FIG. 11 is a flow chart representing a flow of a recording program which is executed in a cycle of a predetermined time. This flow begins with S1 at which the data such as the vehicle data is recorded into the volatile memory 32. At S2, it is determined whether the recording requirement flag Fm is ON. When the recording requirement flag Fm is OFF, the processings at S1 and S2 are repeated to continue recording the data such as the vehicle data into the volatile memory 32. When the recording requirement flag Fm is ON, a positive decision (YES) is made at S2, and the data, such as the vehicle data, stored in the volatile memory 32 is at S3 recorded into the non-volatile memory 34. That is, while the recording requirement flag Fm is ON, the processings at the S1-S3 are repeated to record the data, such as the vehicle data, stored in the volatile memory 32, into the non-volatile memory 34.

The driving support ECU 10 is principally constituted by a computer and includes a CPU as an executer, a storage, and an input/output device, not illustrated. Devices including the camera 40 and an LDA switch 41 are connected to the input/output device. The camera 40 is installed on a back surface of a front glass of the own vehicle 8 and capable of taking an image including an object and lane lines within a region Rf located on a front side and front lateral sides of the own vehicle 8. The LDA switch 41 is operable by the driver and turned on when the driver permits execution of the LDA control as driving support.

Figure 10:
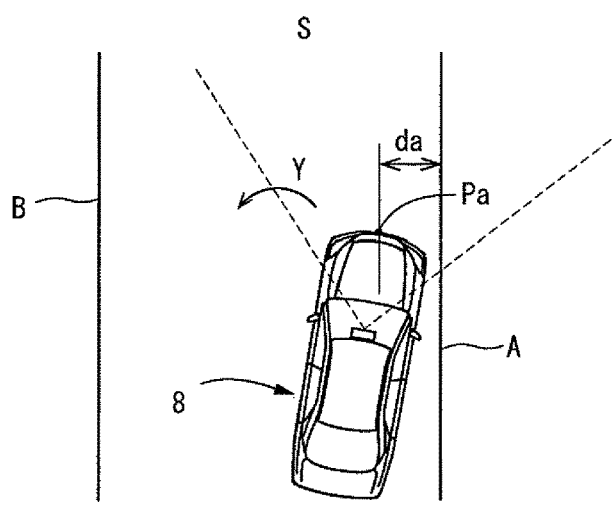
FIG. 10 is a view illustrating a running state of the own vehicle.

The driving support ECU 10 includes an environment obtainer 42, a recording controller 44, and an LDA controller 46. The LDA controller 46 is configured to execute the LDA control that is control for supporting driving so as to prevent the own vehicle 8 from departing outward from an own lane S on which the own vehicle 8 is running. In other words, the LDA controller 46 executes lane-departure preventing control. The LDA control is started when there is a possibility of a departure of the own vehicle 8 from the own lane S. For example, as illustrated in FIG. 10, assuming that the own lane S is defined by lane lines A, B, the LDA control is started when an own-vehicle-side distance da between a predetermined reference point Pa in the own vehicle 8 and the lane line A that is nearer to the reference point Pa than the lane line B is less than or equal to a control-start threshold value dath. In the LDA control, the electric motor 21 is controlled to apply, to the steering mechanism, the steering torque in a direction indicated by arrow Y in FIG. 10, i.e., a direction in which the departure of the own vehicle 8 to the outside of the own lane S is prevented. It is noted that the magnitude of the applied steering torque may be set to a value that is greater when the own-vehicle-side distance da is small than when the own-vehicle-side distance da is large, for example.

Figure 9:
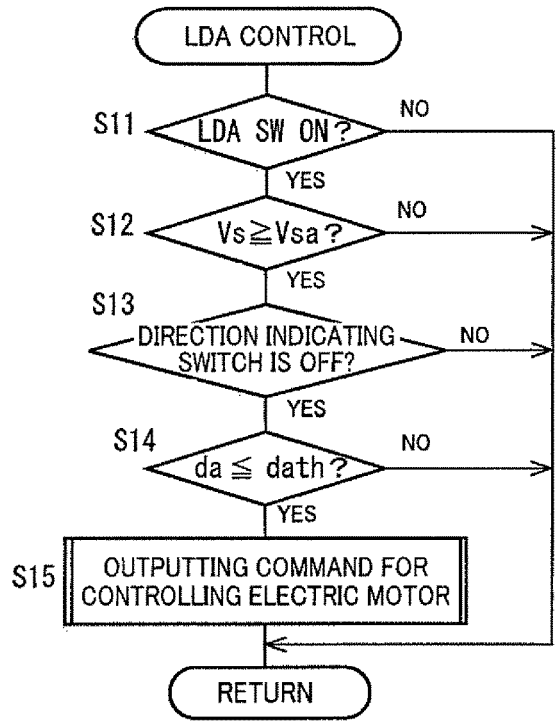
FIG. 9 is a flow chart illustrating a lane-departure-alert (LDA) control program stored in the storage of the driving support ECU.

In the present embodiment, FIG. 9 is a flow chart representing a flow of an LDA control program. This flow begins with S11 at which it is determined whether the LDA switch 41 is ON. When the LDA switch 41 is ON, it is determined at S12 whether the vehicle speed Vs of the own vehicle 8 is greater than or equal to a set speed Vsa that is the lowest speed at which the LDA control is executed. It is noted that the set speed Vsa may be referred to as "lowest start speed Vsa". When the vehicle speed Vs of the own vehicle 8 is greater than or equal to the set speed Vsa, it is determined at S13 whether the direction indicating switch 16 is OFF. When the direction indicating switch 16 is OFF, it is determined at S14 whether the own-vehicle-side distance da is less than or equal to the control-start threshold value dath. When the own-vehicle-side distance da is less than or equal to the control-start threshold value dath, a command for controlling the electric motor 21 is at S15 output to the steering ECU 12 so as to apply, to the steering mechanism, the steering torque in the direction in which the departure of the own vehicle 8 from the own lane S is prevented (the direction indicated by the arrow Y in the case in FIG. 10). In the steering system 20, the steering ECU 12 controls the electric motor 21 to apply, to the steering mechanism, the steering torque in the direction in which the departure of the own vehicle 8 to the outside of the own lane S is prevented. This control performs the driving support by prompting the driver to perform the steering operation for preventing the departure of the own vehicle 8 from the lane line A to the outside of the own lane S.

The environment obtainer 42 is configured to obtain an environment in the region Rf based on an image taken by the camera 40, for example. The environment obtainer 42 includes a lane-line recognizer 48 and a relative-positional-relationship obtainer 49. The area in which the environment is obtained by the environment obtainer 42 is determined in accordance with an installed position of the camera 40 and the characteristics of the camera 40, for example. In the present embodiment, since the camera 40 is installed on a front portion of the own vehicle 8, the region Rf is located on a front side and front lateral sides of the own vehicle 8. The environment is determined by a relative positional relationship between the own vehicle 8 and the object located in the region Rf. It is in some case considered that a relative positional relationship between the object and one of the lane lines defining the own lane is the relative positional relationship between the object and the own vehicle.

The lane-line recognizer 48 is configured to recognize the lane line in the region Rf based on the image taken by the camera 40, for example. For example, as illustrated in FIG. 1, the lane-line recognizer 48 identifies the lane lines A, B defining the own lane S from opposite sides thereof. The relative-positional-relationship obtainer 49 is configured to identify an object X based on the image taken by the camera 40 and obtain the relative positional relationship between the object X and the own vehicle 8. As the relative positional relationship between the own vehicle 8 and the object X, in the present embodiment, as illustrated in FIG. 1, the relative-positional-relationship obtainer 49 obtains: a vehicle-to-object distance L that is a distance between the own vehicle 8 and the object X in a front and rear direction which may be referred to as "running direction"; an object-side distance dv that is a distance between a predetermined reference point Pv in the object X and the lane line A defining the own lane S which is nearer to the object X than the lane line B, in a lateral direction of the own vehicle 8 which may be referred to as "widthwise direction"; a relative velocity; and a direction directed from the own vehicle 8 to the object X.

The vehicle-to-object distance L is a value obtained assuming that the own vehicle 8 and the object X are on the same lane. As illustrated in FIG. 1, the object-side distance dv takes a positive value when the predetermined reference point Pv in the object X is located outside the own lane S, that is, when the predetermined reference point Pv is located on an opposite side of the lane line A from the own lane S, for example. The object-side distance dv takes a negative value when the predetermined reference point Pv is located in the own lane S, that is, when the predetermined reference point Pv and the own lane S are located on the same side of the lane line A. The distance between the object X and the own vehicle 8 in the lateral direction becomes relatively smaller when the object-side distance dv is small than when the object-side distance dv is large. Thus, it is possible to consider that the object-side distance dv is a physical quantity representing a relative positional relationship between the own vehicle 8 and the object X in the lateral direction. The direction directed from the own vehicle 8 to the object X is a front-right direction in the case where the object X is present on a lane located next to and to the right of the own lane S as illustrated in FIG. 1, for example.

In the present embodiment, in the case where the vehicle-to-object distance L is less than or equal to a set vehicle-to-object distance Lth, and the object-side distance dv is less than or equal to a first set object-side distance dvth1 (a positive value), and an approach velocity SV as the relative velocity is greater than or equal to a set approach velocity SVth (which may be referred to as "set relative velocity SVth"), it is determined that the object X and the own vehicle 8 have a predetermined specific relationship, and the object X is set as a specific object OV. In the case where the specific object OV is present, it is estimated that the driver is to perform a steering operation, at an operating speed greater than or equal to a threshold value which will be described below, in a direction in which the own vehicle 8 avoids the specific object OV, and it is estimated that the own vehicle 8 is to avoid the specific object OV speedily. In other words, the specific relationship may be a relationship in which it is estimated that the steering operation in the direction in which the own vehicle 8 avoids the specific object OV is to be performed at the operating speed greater than or equal to the threshold value.

When the object-side distance dv is short, the driver more easily feels a high necessity for the own vehicle 8 to avoid the object X, than when the object-side distance dv is long. The first set object-side distance dvth1 may be set to such a distance that it is estimated that the steering operation in the direction in which the own vehicle 8 avoids the object X is to be performed by the driver. It is known that the first set object-side distance dvth1 is about 30 cm in general.

It is possible to consider that the driver has a higher necessity of performing the steering operation at a greater operating speed to drive the own vehicle 8 so as to avoid the specific object OV, when the vehicle-to-object distance is short, and the approach velocity is high than when the vehicle-to-object distance is long, and the approach velocity is low. Thus, each of the set vehicle-to-object distance Lth and the set relative velocity SVth may be set to such a value that it is estimated that the driver is to perform the steering operation at the operating speed greater than or equal to the threshold value to drive the own vehicle 8 so as to avoid the specific object OV. It is known that the set vehicle-to-object distance Lth and the set relative velocity SVth are about 50 m and about 30 km/h, respectively, in general.

When the object-side distance dv is greater than or equal to a second set object-side distance dvth2 (a negative value), it is determined that the object X is present on a front right side or a front left side of the own vehicle 8. The case where the object-side distance dv is less than or equal to the first set object-side distance dvth1 includes a case where at least a portion of the object X is located in the own lane. However, in the case where more than half of the object X is located in the own lane, for example, it may be difficult to determine whether the object X is located on a front right side of the own vehicle 8 and whether the object X is located on a front left side of the own vehicle 8, and it may be difficult to estimate whether the steering operation for avoiding the object X is to be performed in the right direction or the left direction. To overcome this problem, in the present embodiment, when the object-side distance dv is greater than or equal to the second set object-side distance dvth2, it is determined that the object X is present on a front right side or a front left side of the own vehicle 8, and when the object-side distance dv is less than the second set object-side distance dvth2, it is determined that the object X is located in front of the own vehicle 8. It is noted that the second set object-side distance dvth2 may be about −50 cm in general.

The recording controller 44 is configured to control a timing of recording of the data, such as the vehicle data relating to the own vehicle 8, into the non-volatile memory 34. The recording controller 44 turns the recording requirement flag Fm to ON upon satisfaction of a recording condition including a condition that a speed at which the steering wheel 24 is operated by the driver is greater than or equal to a threshold value dθth. The speed at which the steering wheel 24 is operated by the driver may be hereinafter referred to as "operating speed dθ" (a rotation angle speed).

In the present embodiment, the recording controller 44 includes a first recording controller 50, a second recording controller 52, and a threshold-value changer 56. When the operating speed dθ is greater than or equal to a first set steering-related value as a threshold value (which is a first set operating speed dθHth in the present embodiment), and this state has continued for a length of time greater than or equal to a determination time Tth, the first recording controller 50 determines that a recording condition as a first recording condition is satisfied, and turns the recording requirement flag Fm to ON. The first set operating speed dθHth may be set at a speed that is hard to achieve by the steering operation in a normal traveling of the vehicle and that is achieved in the case where a steering operation is performed in a direction in which the own vehicle 8 quickly avoids the object, for example. Also in the case of parking, the steering wheel 24 is in some cases operated at an operating speed greater than or equal to the first set operating speed dθHth. The determination time Tth may be a length of time for prevenging erroneous determination due to noise, for example. The determination time Tth prevents erroneous satisfaction of the recording condition due to, e.g., noise and originally-unnecessary recording of the data such as the vehicle data into the non-volatile memory 34.

The second recording controller 52 determines that a recording condition as a second recording condition is satisfied, and turns the recording requirement flag Fm to ON, when a value of a not-normal-feeling-estimation flag Fa is equal to that of the steering-direction flag Fs and when a state in which the operating speed dθ is greater than or equal to a second set operating speed dθLth as a threshold value has continued for a length of time greater than or equal to a determination time Tth. In the present embodiment, each of the first recording condition and the second recording condition may be hereinafter simply referred to as "recording condition" without distinction between the first recording condition and the second recording condition. This is because there is little need for this distinction since the recording requirement flag Fm is turned to ON when any of the first recording condition and the second recording condition is satisfied.

The not-normal-feeling-estimation flag Fa is turned to ON (Fa=1, 2) when, assuming that the LDA control has been executed, a direction of steering torque estimated to be applied in the LDA control is reverse to a direction of a steering operation estimated to be performed by the driver, and thereby the driver feels something not normal (hereinafter may be referred to as "not-normal feeling"). The not-normal-feeling-estimation flag Fa is set based on the direction directed from the own vehicle 8 to the specific object OV in the case where the specific object OV is present. In the present embodiment, the not-normal-feeling-estimation flag Fa is set by a not-normal-feeling-estimation-flag setter 54 according to a not-normal-feeling-estimation-flag setting program represented by the flow chart in FIG. 6.

Figure 6:
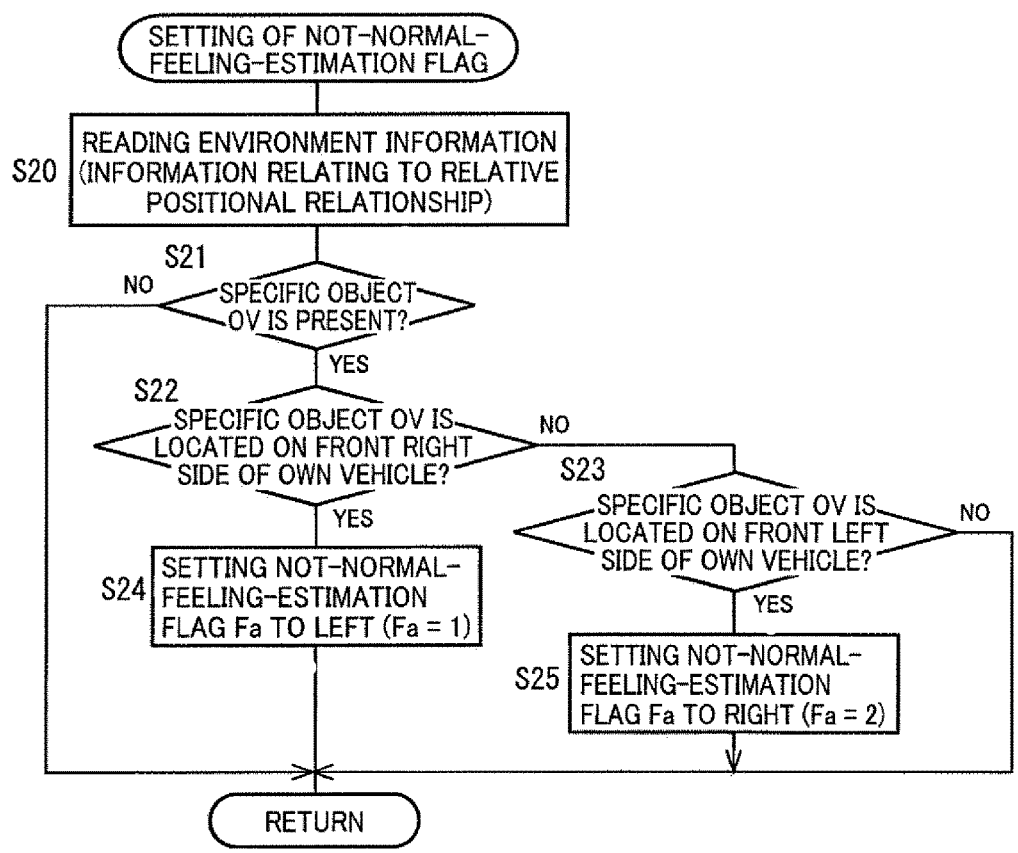
FIG. 6 is a flow chart illustrating a not-normal-feeling-estimation-flag setting program stored in the storage.

The flow in FIG. 6 begins with S20 at which environment information is read. Examples of the environment information include information relating to a relative positional relationship between the object X and the own vehicle 8. It is determined at S21 whether the specific object OV is present. In the case where the specific object OV is present, it is determined at S22 whether the specific object OV is located on a front right side of the own vehicle 8. When it is determined that the specific object OV is not located on a front right side of the own vehicle 8, it is determined at S23 whether the specific object OV is located on a front left side of the own vehicle 8. When it is determined that the specific object OV is located on a front right side of the own vehicle 8, the not-normal-feeling-estimation flag Fa is set to the left (Fa=1) at S24. When it is determined that the specific object OV is located on a front left side of the own vehicle 8, the not-normal-feeling-estimation flag Fa is set to the right (Fa=2) at S25. When it is determined that the specific object OV is not located on a front left side of the own vehicle 8, it is not clear that the driver is to perform the steering operation in the right direction or the left direction. Thus, the not-normal-feeling-estimation flag Fa is kept to OFF.

Figure 7:
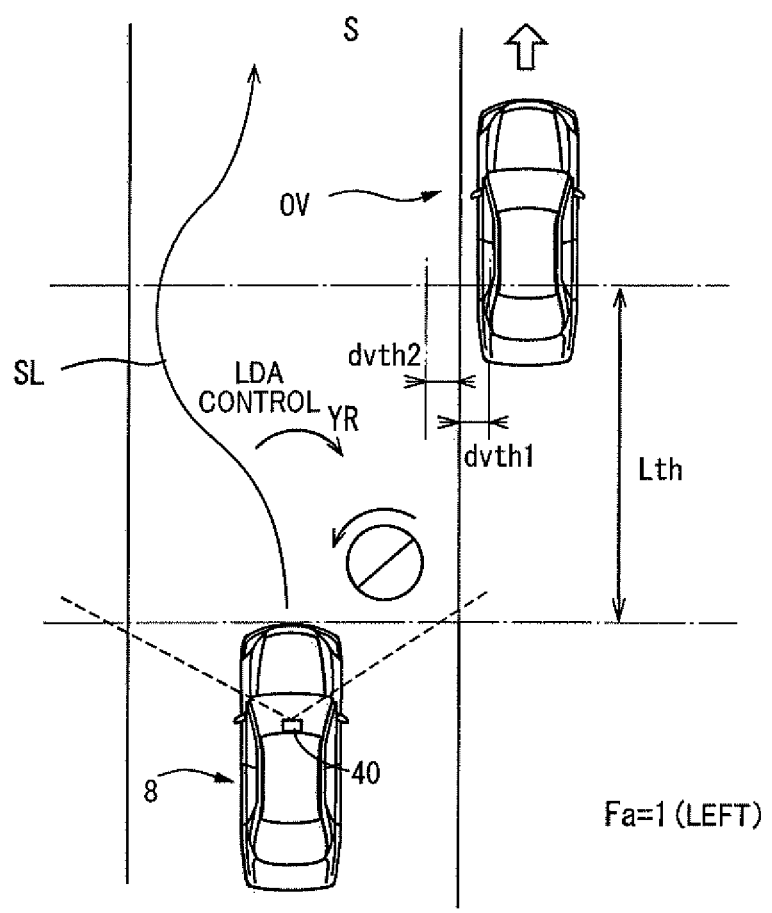
FIG. 7 is a relative positional relationship between the own vehicle and a specific object in the case where a not-normal-feeling-estimation flag is set to the left.

For example, as illustrated in FIG. 7, when the specific object OV is located on a front right side of the own vehicle 8, it is estimated that the driver is to operate the steering wheel 24 in the left direction to cause the own vehicle 8 to make a left detour as indicated by the solid line SL. Thus, if the LDA control is executed, it is estimated that rightward steering torque indicated by the arrow YR is applied to the steering mechanism, which gives the not-normal feeling to the driver. That is, when the driver has performed the steering operation in the left direction, it is estimated that the driver feels the not-normal feeling. Thus, the not-normal-feeling-estimation flag is set to the left (ON, Fa=1). The value of the not-normal-feeling-estimation flag Fa is equal to the value of the steering-direction flag Fs (Fa=Fs=1) in the case where the driver has actually operated the steering wheel 24 in the left direction in a state in which it is estimated that the driver feels the not-normal feeling when the driver performs the steering operation in the left direction. This case is independent of whether the LDA control is to be executed actually, but in the case where the LDA control is executed, the driver feels the not-normal feeling.

Figure 8:
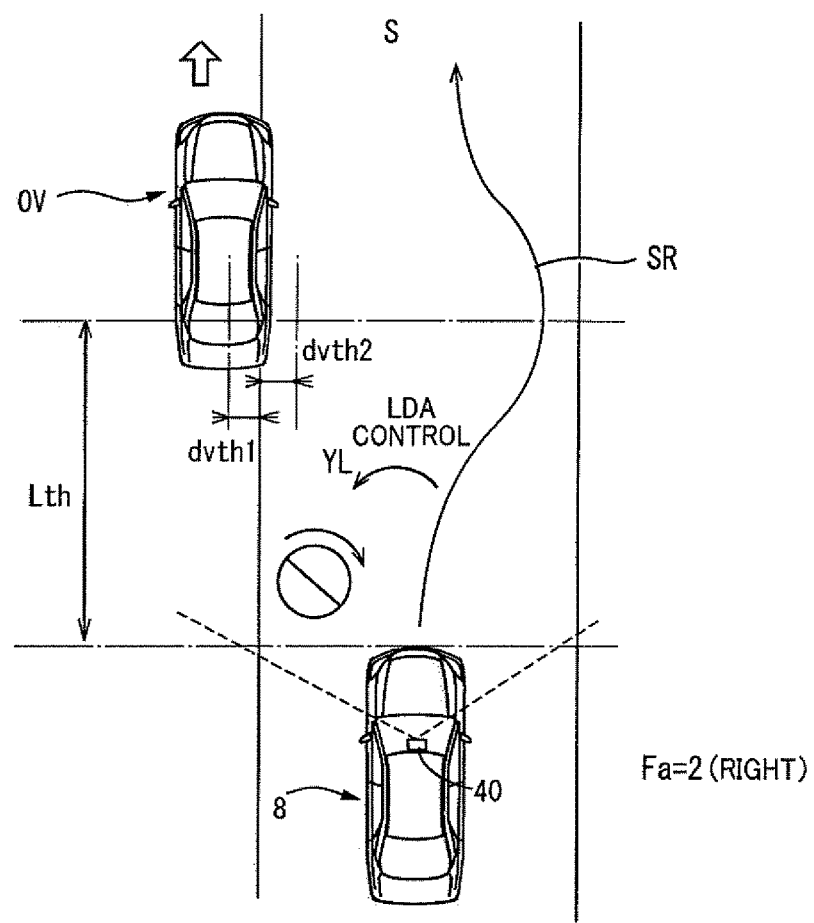
FIG. 8 is a relative positional relationship between the own vehicle and the specific object in the case where the not-normal-feeling-estimation flag is set to the right.

On the other hand, as illustrated in FIG. 8, when the specific object OV is located on a front left side of the own vehicle 8, it is estimated that the driver is to operate the steering wheel 24 in the right direction to cause the own vehicle 8 to make a right detour as indicated by the solid line SR. Thus, if the LDA control is executed, it is estimated that leftward steering torque indicated by the arrow YL is applied to the steering mechanism, which gives the not-normal feeling to the driver. That is, when the driver has performed the steering operation in the right direction, it is estimated that the driver feels the not-normal feeling. Thus, the not-normal-feeling-estimation flag is set to the right (ON, Fa=2). In the case where the value of the not-normal-feeling-estimation flag Fa is equal to the value of the steering-direction flag Fs (Fa=Fs=2), when the LDA control is executed, the driver feels the not-normal feeling.

The threshold value for the speed of operation of the steering wheel 24 is changed by the threshold-value changer 56. When the specific object OV is present, the threshold-value changer 56 changes the threshold value from the first set operating speed dθHth as one example of the first set steering-related value to the second set operating speed dθLth as one example of a second set steering-related value. The second set operating speed dθLth is less than the first set operating speed dθHth. When the specific object OV is present, the threshold value for the operating speed is reduced to facilitate satisfaction of the recording condition. In the case where the specific object OV is present, examples of the data such as the vehicle data include: the driving data representing a steering operation of the driver for driving the own vehicle 8 away from the specific object OV; the running data such as the vehicle speed and the yaw rate of the own vehicle 8 in the driving of the own vehicle 8 away from the specific object OV; the control data representing a state of the LDA control; and the image data including the object and so on in the region Rf. One example of the image data is image data based on an image taken by the camera 40, for example. The data such as the vehicle data is important for analyzing an operation state of the driver and a running state of the vehicle with a position of the object in the region Rf in the case where the specific object OV is present and is important for reviewing the LDA control based on the data such as the vehicle data. Accordingly, in the case where the specific object OV is present, the threshold value is set to a small value to increase a possibility of recording of the data such as the vehicle data.

Figure 3:
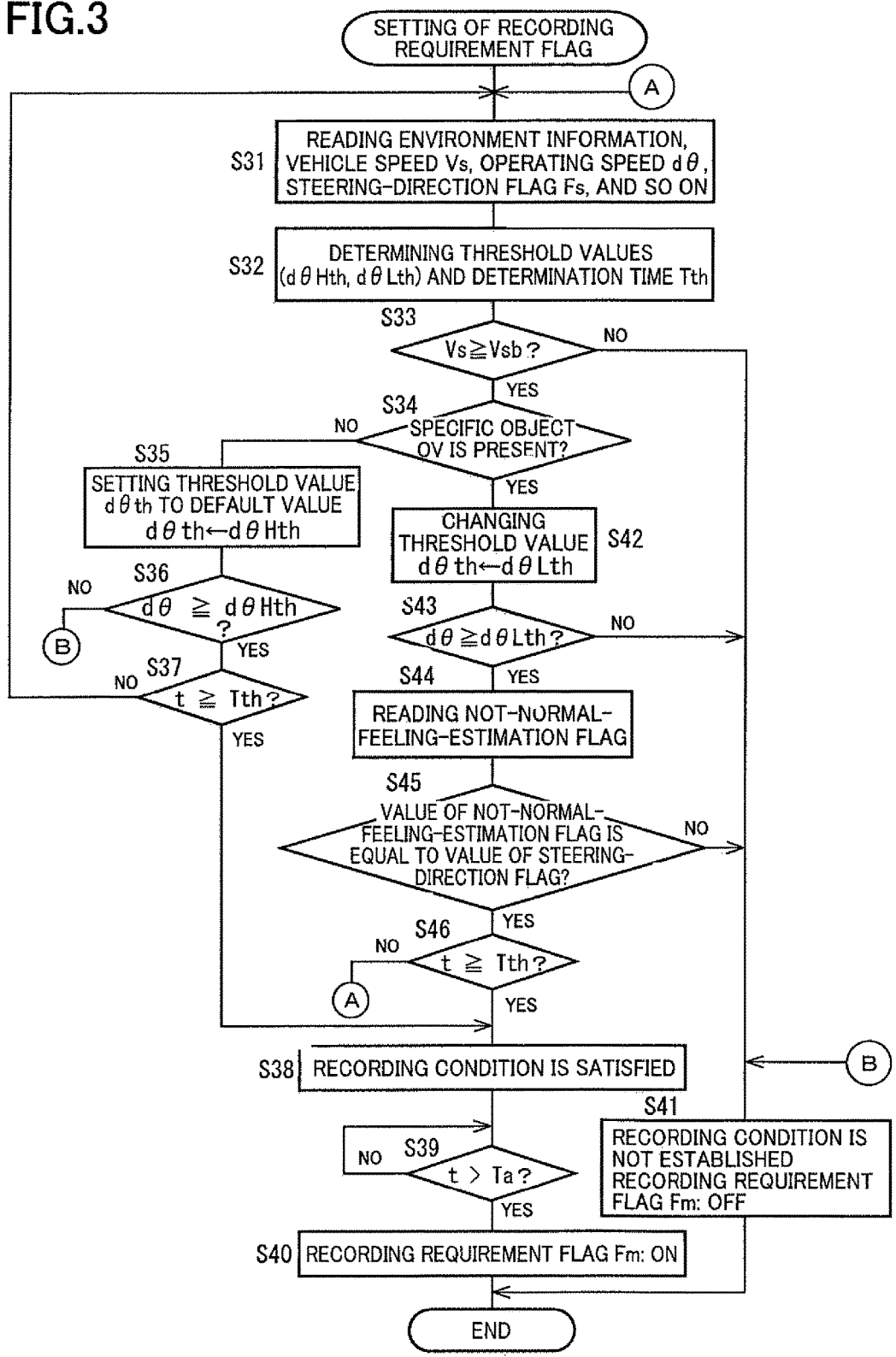
FIG. 3 is a flow chart representing a procedure of a recording-requirement-flag setting program stored in a storage of a driving support electric control unit (ECU) of the own vehicle.

The recording requirement flag Fm is set according to a recording-requirement-flag setting program represented by the flow chart in FIG. 3. The flow in FIG. 3 begins with S31 at which the following information is read: the vehicle speed Vs detected by the vehicle speed sensor 15; the operating speed obtained based on the detection value output from the operation-angle sensor 28; the steering-direction flag Fs set based on the detection value output from the operation-angle sensor 28; and the environment information (including information representing the relative positional relationship between the own vehicle 8 and the object X), for example. At S32, the threshold values and the determination time Tth are determined based on the vehicle speed Vs.

Figure 4:
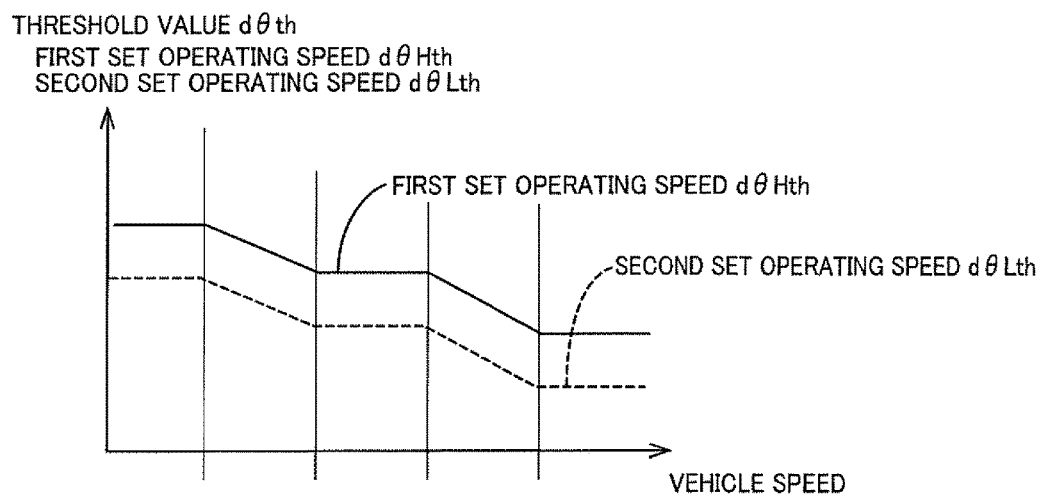
FIG. 4 is a view illustrating a relationship between a vehicle speed and threshold values stored in the storage.
Figure 5:
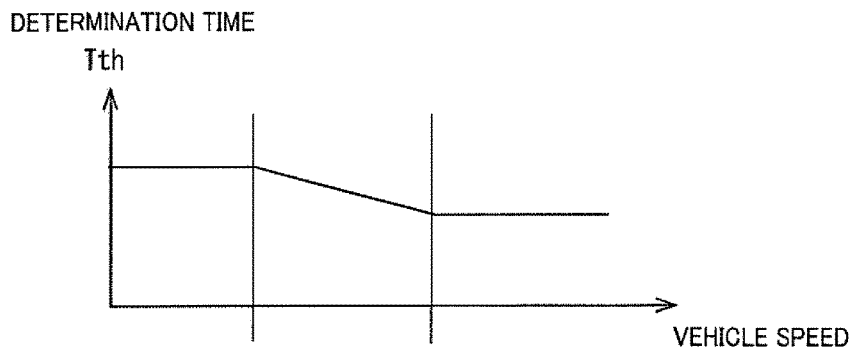
FIG. 5 is a view illustrating a relationship between the vehicle speed and a determination time stored in the storage.

As illustrated in FIG. 4, each of the first set operating speed dθHth and the second set operating speed dθLth as the threshold values is determined to a smaller value when the vehicle speed Vs is large than when the vehicle speed Vs is small. The first set operating speed dθHth is determined according to the relationship indicated by the solid line in FIG. 4. The second set operating speed dθLth is determined according to the relationship indicated by the broken line in FIG. 4. The second set operating speed dθLth is set to a value that is less than the first set operating speed dθHth. In the case where the vehicle speed Vs is high, a large steering operation is unnecessary for driving of the own vehicle 8 when compared with the case where the vehicle speed Vs is low. Thus, the threshold value for the operating speed is set to a smaller value when the vehicle speed Vs is high than when the vehicle speed Vs is low. Likewise, as illustrated in FIG. 5, the determination time Tth is set to a shorter time when the vehicle speed Vs is high than when the vehicle speed Vs is low. This is because there is no need to perform the steering operation at a high speed for a long time when the vehicle speed Vs is high.

At S33, it is determined whether the vehicle speed Vs is greater than or equal to a set speed Vsb. The set speed Vsb is greater than a speed of the own vehicle 8 during parking and less than the lowest start speed Vsa that is the lowest speed at which the LDA control is executed. In other words, when the vehicle speed Vs is greater than or equal to the set speed Vsb, it is determined that the own vehicle 8 travels not for parking, for example. This configuration prevents erroneous recording of the data such as the vehicle data into the non-volatile memory 34 in the case where the steering wheel 24 is operated at a high speed for parking, for example. Even in the case where the vehicle speed Vs is less than the lowest start speed Vsa, the driver in some cases feels that the LDA control has been executed. In these cases, in the event of an accident, the driver may determine that the accident is caused by the LDA control. Accordingly, it is appropriate that the set speed Vsb is set to a value less than the lowest start speed Vsa to record the data such as the vehicle data without execution of the LDA control.

At S34, it is determined whether the specific object OV is present, based on the relative positional relationship between the object X and the own vehicle 8 which is obtained by the relative-positional-relationship obtainer 49. The specific object OV is the object X having the specific relationship as the relative positional relationship. When the specific object OV is absent, that is, when a negative decision (NO) is made at S34, the threshold value dθth is set to a default value at S35, that is, the threshold value dθth is set to the first set operating speed dθHth greater than the second set operating speed dθLth. It is determined at S36 whether the operating speed dθ is greater than or equal to the first set operating speed dθHth. When the operating speed dθ is greater than or equal to the first set operating speed dθHth, it is determined at S37 whether a time elapsed from the positive decision (YES) at S36 exceeds the determination time Tth. When a negative decision (NO) is made at S37, the processings at S31-S37 are repeated to determine whether the vehicle speed Vs is greater than or equal to the set speed Vsb and whether a state in which the operating speed dθ is greater than or equal to the first set operating speed dθHth has continued for a time greater than or equal to the determination time Tth. When the state has continued for a time greater than or equal to the determination time Tth during repeated execution of the processings at S31-S37, a positive decision (YES) is made at S37, and it is determined at S38 that the recording condition (the first recording condition in this case) is satisfied. After an elapse of a predetermined holding time Ta at S39, the recording requirement flag Fm is turned to ON at S40.

When the recording requirement flag Fm is turned to ON, the air-bag ECU 14 records the data, such as the vehicle data, stored in the volatile memory 32 into the non-volatile memory 34. Since the recording requirement flag Fm is turned to ON after the holding time Ta is elapsed from the satisfaction of the recording condition, the data, such as the vehicle data, stored in the volatile memory 32 before the satisfaction of the recording condition and in a period from the satisfaction of the recording condition to the end of the holding time Ta is recorded into the non-volatile memory 34. The predetermined area of the volatile memory 32 cannot store the data such as the vehicle data having an amount exceeding the set capacity. Thus, the non-volatile memory 34 stores the preceding data such as the vehicle data having an amount corresponding to the set capacity from the newest vehicle data obtained after the elapse of the holding time Ta from the satisfaction of the recording condition. In the case where the steering wheel 24 is steered at the operating speed greater than or equal to the first set operating speed dθHth, not only the data such as the vehicle data before this steering operation but also the data such as the vehicle data during the holding time Ta after the steering operation is important for analyzing the steering operation of the driver, the running state of the vehicle, and so on. Thus, the recording requirement flag Fm is turned to ON after the elapse of the holding time Ta from the satisfaction of the recording condition. It is noted that the holding time Ta is a time required to obtain important driving data when the steering operation is performed at a speed greater than or equal to the threshold value, and the holding time Ta is preferably set to a time between about two and six seconds.

When the operating speed dθ is less than the first set operating speed dθHth or when a negative decision (NO) is made at S33 or S36 before the elapse of the determination time Tth, it is determined at S41 that the recording condition is not satisfied, and the recording requirement flag Fm is turned to OFF. The data such as the vehicle data is not recorded into the non-volatile memory 34.

When the specific object OV is present, a positive decision (YES) is made at S34, and the threshold value dθth is at S42 changed from the default value to the second set operating speed dθLth that is less than the first set operating speed dθHth. It is determined at S43 whether the operating speed dθ of the steering wheel 24 is greater than or equal to the second set operating speed dθLth. When the operating speed dθ of the steering wheel 24 is greater than or equal to the second set operating speed dθLth, the not-normal-feeling-estimation flag Fa is read at S44. At S45, it is determined whether the value of the not-normal-feeling-estimation flag Fa is equal to the value of the steering-direction flag Fs. When the value of the not-normal-feeling-estimation flag Fa is equal to the value of the steering-direction flag Fs, it is determined at S46 whether a state in which positive decisions (YES) are made at S33, S43, and S45 has continued for a time greater than or equal to the determination time Tth. When a negative decision (NO) is made at S46, the processings at S31-S34 and S42-S46 are repeated to determine whether the vehicle speed Vs is greater than or equal to the set speed Vsa, whether the value of the not-normal-feeling-estimation flag Fa is equal to the value of the steering-direction flag Fs, and whether the state in which the operating speed dθ is greater than or equal to the second set operating speed dθLth has continued for a time greater than or equal to the determination time Tth. When the determination time Tth is elapsed, a positive decision (YES) is made at S46, and it is determined at S38 that the recording condition (the second recording condition in this case) is satisfied. The recording requirement flag Fm is then turned to ON at S40 after the elapse of the holding time Ta at S39. The air-bag ECU 14 records the data, such as the vehicle data, stored in the volatile memory 32, into the non-volatile memory 34. In the case where the state in which the positive decisions (YES) are made at S33, S43, and S45 has continued for a time greater than or equal to the determination time Th, it is determined that the recording condition is satisfied, and the recording requirement flag is turned to ON. This makes it difficult for originally-unnecessary data such as the vehicle data to be recorded into the non-volatile memory 34 due to noise, for example.

In contrast, when the operating speed dθ is less than the second set operating speed dθLth, when the value of the not-normal-feeling-estimation flag Fa is not equal to the value of the steering-direction flag Fs, or when the state in which the positive decisions (YES) are made at S33, S43, and S45 has not continued for a time greater than or equal to the determination time Tth, it is determined at S41 that the recording condition is not satisfied, and the recording requirement flag Fm is turned to OFF. The data such as the vehicle data is not recorded into the non-volatile memory 34. At S41, the threshold value is set to the default value.

Figure 12:
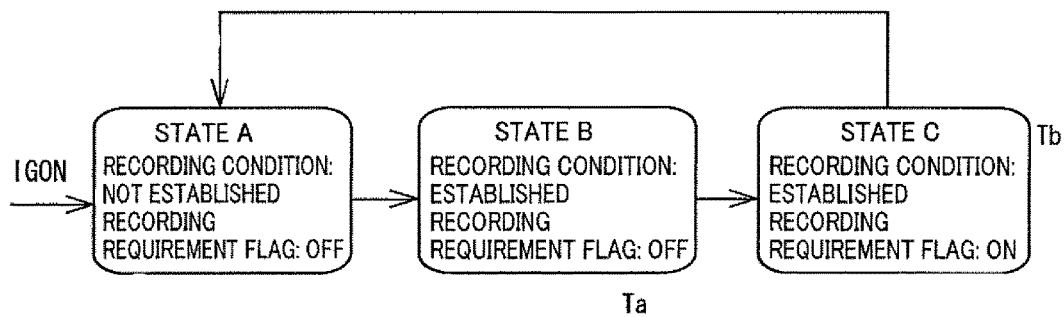
FIG. 12 is a view illustrating a transition of a state of the own vehicle in the case where the recording-requirement-flag setting program is executed.

In the present embodiment as described above, as illustrated in FIG. 12, when the ignition switch is turned to ON, a state A is established, and the threshold value is set to the first set operating speed dθHth as the default value. During normal traveling of the vehicle 8, the steering operation is not performed in most cases at a speed greater than or equal to the first set operating speed dθHth. Thus, the processings at S31-S36 and S41 are repeated, so that the recording condition is not satisfied, and the recording requirement flag Fm is kept in the OFF state (S41). It is noted that, even when the recording requirement flag Fm is OFF, the data such as the vehicle data is recorded into the volatile memory 32.

In contrast, when the state in which the operating speed is greater than or equal to the first set operating speed dθHth has continued for a time greater than or equal to the determination time Tth (S37: YES) or when the specific object OV is detected, and the operating speed is greater than or equal to the second set operating speed dθLth, and the state in which the value of the not-normal-feeling-estimation flag Fa is equal to the value of the steering-direction flag Fs has continued for a time greater than or equal to the determination time Tth (S46: YES), for example, a state B is established, and it is determined that the recording condition is satisfied (S38). This state B is kept for the holding time Ta (S39). The recording requirement flag Fm is there-after turned to ON (S40), and a state C is established. The state C is kept for a waiting time Tb. In the state C, the recording requirement flag Fm is in the ON state, and the data such as the vehicle data in the volatile memory 32 is recorded into the non-volatile memory 34. The waiting time Tb is less than the holding time Ta. In analysis of the data such as the vehicle data recorded in the non-volatile memory 34, the waiting time Tb facilitates distinction among groups of the data such as the vehicle data created in the case where one recording condition is satisfied. When the waiting time Tb is elapsed, the state A is established again, and the threshold value is set back to the first set operating speed dθHth as the default value.

It is noted that, in the above-described embodiment, in the case where the specific object OV is present in front of the own vehicle 8 on the own lane S, it is difficult to estimate whether the driver is to perform the steering operation in the right direction or the left direction, and accordingly the not-normal-feeling-estimation flag Fa is kept OFF. In the case where the specific object OV is present in front of the own vehicle 8, however, it is estimated that the driver is to perform the steering operation in the right direction or the left direction in order for the own vehicle 8 to avoid the object X, and it is estimated that the LDA control is to be executed in response to the steering operation, leading to the not-normal feeling given to the driver. Thus, this vehicle-data recorder may be configured, for example, such that when a negative decision (NO) is made at S23, the not-normal-feeling-estimation flag Fa is set to ON (e.g., a value "3" indicating the right or the left), and it is determined that a positive decision (YES) is made at S45 regardless of whether the direction of the steering operation of the driver is the right or left and such that when the steering wheel 24 is operated at a speed greater than or equal to the second set operating speed dθLth, the data, such as the vehicle data, stored in the volatile memory 32 is recorded into the non-volatile memory 34.

In the present embodiment as described above, in the case where the specific object OV is present, the threshold value for the operating speed is changed to the second set operating speed dθLth less than the first set operating speed dθHth. Thus, when compared with the case where the specific object OV is absent, the recording condition is easily satisfied, resulting in increase in frequency of recording of the data such as the vehicle data into the non-volatile memory 34. Also, a small amount of data such as the vehicle data is stored when compared with the case where the data such as the vehicle data is stored into the non-volatile memory 34 when the object X is detected. This configuration reduces a possibility of the amount of the data exceeding the capacity of the non-volatile memory 34, resulting in increase in frequency of recording of the data into the non-volatile memory 34 when the specific object OV is present.

In the present embodiment described above, the vehicle-data recorder is constituted by devices including the driving support ECU 10, the CPU 30 of the air-bag ECU 14, and the camera 40. A first recorder is constituted by the first recording controller 50 of the driving support ECU 10 and portions of the CPU 30 of the air-bag ECU 14 which store and execute the processings at S1-S3 in the flow chart in FIG. 11, for example. A second recorder is constituted by the relative-positional-relationship obtainer 49 and the second recording controller 52 of the driving support ECU 10 and portions of the CPU 30 of the air-bag ECU 14 which store and execute the processings at S1-S3, for example. The first recording controller 50 is constituted by portions of the driving support ECU 10 which store and execute the processings at S31-S41 in the flow chart in FIG. 3 which represents the recording-requirement-flag setting program, for example. The second recording controller 52 is constituted by portions of the driving support ECU 10 which store and execute the processings at S31-S34 and S38-S46 in the flow chart in FIG. 3, for example. The threshold-value changer 56 is constituted by portions of the second recording controller 52 which store and execute the processings at S34, S35, and S42, for example. The non-volatile memory 34 of the air-bag ECU 14 is one example of a storage. The camera 40 is one example of an object-information obtainer. The image data obtained by the camera 40 is one example of the object information. The first set object-side distance is one example of a set object-side distance. A first recording-condition satisfaction determiner is constituted by the first recording controller 50 (e.g., its portions which store and execute the processings at S34 and S35-S37), for example. A second recording-condition satisfaction determiner is constituted by the second recording controller 52 (e.g., its portions which store and execute the processings at S34 and S42-S46), for example. A vehicle-data recording controller is constituted by the relative-positional-relationship obtainer 49 and the recording controller 44 of the driving support ECU 10, for example. A third recorder is constituted by portions of the CPU 30 of the air-bag ECU 14 which store and execute the processing at S1. The driving supporter is constituted by the LDA controller 46 and the electric power steering device 22, for example.

It is noted that, while the data such as the vehicle data is recorded in relation to the LDA control as the driving support in the above-described embodiment, the data such as the vehicle data may be recorded in relation to not only the LDA control but also lane-keep-assist (LKA) control and support for steering, for example. The data such as the vehicle data may be recorded when the driver actually feels the not-normal feeling in the case where the specific object OV is detected, for example. Also, in the case where the specific object OV is present, the data such as the vehicle data may be recorded regardless of the value of the not-normal-feeling-estimation flag Fa, the value of the steering-direction flag Fs, and the operating speed, for example.

While the data such as the vehicle data stored in the volatile memory 32 is recorded into the non-volatile memory 34 in the above-described embodiment, the present disclosure may be applied to a configuration in which the data such as the vehicle data is directly recorded into the non-volatile memory 34.

While the operating speed is used as the steering-related value in the above-described embodiment, the steering torque, the operation angle, and the yaw rate may be used as the steering-related value, for example. In the above-described embodiment, the environment obtainer 42 obtains the environment in the region Rf based on the image taken by the camera 40. However, the environment obtainer 42 may obtain the environment in the region Rf based on at least one of the image taken by the camera 40 and a signal obtained by a radar device, not illustrated.

The vehicle-data recorder includes a plurality of the ECUs (CPUs) in the above-described embodiment but may include a single ECU. It is to be understood that the disclosure is not limited to the details of the illustrated embodiment, but may be embodied with various changes and modifications, which may occur to those skilled in the art, without departing from the spirit and scope of the disclosure.

Claimable Inventions

There will be described claimable inventions in the following forms.

(1) A vehicle-data recorder configured to record vehicle data into a storage when a recording condition is satisfied, the recording condition comprising a condition that a steering-related value representing one of a state of a steering operation performed by a driver and a vehicle behavior caused by the steering operation is greater than or equal to a threshold value, the vehicle-data recorder comprising:

an object-information obtainer configured to obtain object information relating to at least an object in an area; and a threshold-value changer configured to change the threshold value to a smaller value when a relative positional relationship between an own vehicle and the object located in the area and identified based on the object information obtained by the object-information obtainer is a specific relationship in which it is estimated that a steering operation is to be performed in a direction in which the own vehicle avoids the object, than when the relative positional relationship is not the specific relationship.

Examples of the case where the relative positional relationship is not the specific relationship include: a case where the object is detected based on the object information obtained by the object-information obtainer, but the relative positional relationship between the object and the own vehicle is not the specific relationship; and a case where the object is not detected based on the object information obtained by the object-information obtainer. Examples of the steering-related value include: a value representing a state of operation of a steering operation member such as a steering wheel and a lever; and a value representing a behavior of the vehicle due to the operation of the steering operation member. Specific examples of the steering-related value include; an amount, a speed, and an acceleration of operation of the steering operation member; steering torque applied to a steering mechanism via the steering operation member; an amount of change of the steering torque; a yaw rate representing a behavior of the vehicle due to the operation of the steering operation member; an acceleration of change in a yaw; and a rudder angle of a steered road wheel. The object-information obtainer may include at least one of a camera and a laser or a radar, for example. The object may be a movable object and a fixed object. Examples of the movable object include a vehicle and a pedestrian. Examples of the fixed object include a road side wall, a guard rail, and an object placed on a road surface. The vehicle may be any of a vehicle traveling in the same direction as that of travel of the own vehicle and a vehicle traveling in a direction opposite to a direction of travel of the own vehicle.

(2) The vehicle-data recorder according to the above form (1), further comprising a relative-positional-relationship obtainer configured to obtain the relative positional relationship between the own vehicle and the object located in the area and identified based on the object information obtained by the object-information obtainer, wherein the threshold-value changer is configured to determine that the relative positional relationship obtained by the relative-positional-relationship obtainer is the specific relationship and change the threshold value, when the relative positional relationship is a relationship in which an object-side distance that is a distance between the object and a lane line defining an own lane on which the own vehicle is running is less than or equal to a set object-side distance.

The object-side distance may be less than or equal to a first set object-side distance as the set object-side distance and greater than or equal to a second set object-side distance to define a direction directed from the own vehicle to the object. This is because it is difficult to estimate a direction of the steering operation of the driver in the case where the object-side distance is less than the second set object-side distance, and the object is present in front of the own vehicle.

(3) The vehicle-data recorder according to the above form (2), wherein the threshold-value changer is configured to determine that the relative positional relationship is the specific relationship, when the relative positional relationship is, in addition to being the relationship in which the object-side distance is less than or equal to the set object-side distance, at least one of (a) a relationship in which a vehicle-to-object distance between the object and the own vehicle is less than or equal to a set vehicle-to-object distance and (b) a relationship in which the own vehicle is approaching the object at a speed greater than or equal to a set speed.

The specific relationship may be a relationship in which it is estimated that the steering operation driving the own vehicle to avoid the object is to be performed at a speed greater than or equal to a threshold value.

(4) The vehicle-data recorder according to any one of the above forms (1) through (3), further comprising:

a first recorder configured to record the vehicle data into the storage when the relative positional relationship is not the specific relationship and when a first recording condition is satisfied, the first recording condition comprising a condition that the steering-related value is greater than or equal to a first set steering-related value as the threshold value; and a second recorder configured to record the vehicle data into the storage when the relative positional relationship is the specific relationship and when a second recording condition is satisfied, the second recording condition comprising a condition that the steering-related value is greater than or equal to a second set steering-related value as the threshold value, the second set steering-related value being less than the first set steering-related value.

In the present vehicle-data recorder, the first set steering-related value is the default value of the threshold value. Thus, the threshold value is changed to the first set steering-related value when an ignition switch is switched from OFF to ON or after recording of the data such as the vehicle data into the storage, for example. The threshold value is changed from the default value to the second set steering-related value when there is an object having the specific relationship as the relative positional relationship with the own vehicle. The steering-related value is detected by the steering-related-value detector, and the steering-related value detected by the steering-related-value detector is compared with the first set steering-related value or the second set steering-related value as the threshold value.

(5) The vehicle-data recorder according to the above form (4), wherein the own vehicle comprises a driving supporter configured to support driving of the driver, wherein the second recording condition is satisfied when the steering-related value is greater than or equal to the second set steering-related value and when a direction of a steering torque estimated to be applied to the own vehicle by the driving supporter based on the relative positional relationship between the object and the own vehicle is reverse to a direction of a steering operation actually performed by the driver, and wherein the second recorder is configured to record the vehicle data into the storage when the second recording condition is satisfied.

One example of the driving supporter is a device configured to perform a support relating to steering. Examples of such a device include a device configured to execute LDA control, and a device configured to execute LKA control. The driving support by the driving supporter may or may not be performed actually. The direction of the steering operation actually performed by the driver is obtained by the steering-operation-state obtainer. In the above-described embodiment, the steering-operation-state obtainer is constituted by the operation-angle sensor 28, the steering-direction flag Fs, and the steering ECU 12 configured to set the steering-direction flag Fs, for example.

(6) The vehicle-data recorder according to the above form (5), wherein the second recording condition is satisfied when the steering-related value is greater than or equal to the second set steering-related value and when a state in which the direction of the steering torque estimated to be applied to the own vehicle by the driving supporter based on the relative positional relationship between the object and the own vehicle is reverse to the direction of the steering operation actually performed by the driver has continued for a time greater than or equal to a determination time, and wherein the second recorder is configured to record the vehicle data into the storage when the second recording condition is satisfied.

The first recorder may also be configured to determine that the first recording condition is satisfied, and record the vehicle data into the storage, when a state in which the steering-related value is greater than or equal to the first set steering-related value has continued for a time greater than or equal to the determination time. The determination time for the second recorder and the determination time for the first recorder may be equal to or different from each other.

(7) The vehicle-data recorder according to the above form (6), wherein the determination time is less when a speed of the own vehicle is high than when the speed of the own vehicle is low.

(8) The vehicle-data recorder according to any one of the above forms (5) through (7), wherein at least one of the first set steering-related value and the second set steering-related value is less when a speed of the own vehicle is high than when the speed of the own vehicle is low.

(9) The vehicle-data recorder according to any one of the above forms (5) through (8), wherein the storage is a non-volatile memory configured to store data even when an ignition switch of the own vehicle is in an OFF state, wherein the vehicle-data recorder further comprises:
a volatile memory configured to temporarily store the vehicle data; and
a third recorder configured to record the vehicle data into the volatile memory in a cycle of a particular time, and wherein the second recorder is configured to record the vehicle data stored in the volatile memory, into the non-volatile memory after a holding time is elapsed from satisfaction of the second recording condition.

(10) The vehicle-data recorder according to any one of the above forms (5) through (9), wherein the first recorder comprises a first recording-condition satisfaction determiner configured to determine whether the first recording condition is satisfied, wherein the first recorder is configured to record the vehicle data into the storage after an elapse of a first holding time from a timing when the first recording-condition satisfaction determiner determines that the first recording condition is satisfied, and wherein the second recorder comprises a second recording-condition satisfaction determiner configured to determine whether the second recording condition is satisfied, and wherein the second recorder is configured to record the vehicle data into the storage after an elapse of a second holding time from a timing when the second recording-condition satisfaction determiner determines that the second recording condition is satisfied.

The first holding time and the second holding time may be equal to or different from each other. The second holding time corresponds to the holding time described in the form (9).

The first recorder may be configured to record the vehicle data stored in the volatile memory, into the non-volatile memory after an elapse of the first holding time when the first recording condition is satisfied.

(11) A vehicle-data recorder comprising a recorder configured to record vehicle data into a storage when a relative positional relationship between an own vehicle and an object located in an area and identified based on object information obtained by an object-information obtainer provided on the own vehicle is a specific relationship in which it is estimated that a steering operation for driving the own vehicle to avoid the object is to be performed.

The technical features according to any one of the above forms (1) through (10) may be incorporated into the present vehicle-data recorder. The recorder corresponds to the second recorder.

(12) The vehicle-data recorder according to the above form (11), wherein the own vehicle comprises a driving supporter configured to support driving of the driver, and wherein the recorder is configured to record the vehicle data into the storage when the relative positional relationship between the object and the own vehicle is the specific relationship and when a direction of steering torque estimated to be applied to the own vehicle by the driving supporter due to a presence of the object is reverse to a direction of a steering operation actually performed by the driver.

(13) Vehicle-data recording controller configured to control recording of vehicle data into a storage, the vehicle-data recording controller comprising:
a first recording instructor configured to instruct recording of the vehicle data into the storage when a first recording condition is satisfied, the first recording condition comprising a condition that a steering-related value representing one of a state of a steering operation performed by a driver and a vehicle behavior caused by the steering operation is greater than or equal to a first set steering-related value; and
a second recording instructor configured to instruct recording of the vehicle data into the storage when a relative positional relationship between an own vehicle and an object located in an area and identified based on object information obtained by an object-information obtainer provided on the own vehicle is a specific relationship in which it is estimated that a steering operation for driving the own vehicle to avoid the object is to be performed and when a second recording condition is satisfied, the second recording condition comprising a condition that the steering-related value is greater than or equal to a second set steering-related value that is less than the first set steering-related value.

The technical features according to any one of the above forms (1) through (12) may be incorporated into the vehicle-data recording controller according to this form.

What is claimed is:

1. A vehicle-data recorder comprising:
   a steering-related-value sensor configured to detect a steering-related value representing one of: (i) a state of a steering operation of a steering wheel of a vehicle, and (ii) a vehicle behavior caused by the steering operation;
   a camera configured to capture object information relating to at least an object in an area surrounding the vehicle;
   a first electronic control unit configured to record vehicle data into a memory in response to a recording condition being satisfied, the recording condition being satisfied when the detected steering-related value detected by the steering-related-value sensor is greater than or equal to a threshold value; and
   a second electronic control unit connected to the camera, the second electronic control unit being configured to:
      identify the object located in the area based on an image captured by the camera, and obtain a relative positional relationship between the identified object and the vehicle; and
      in response to the obtained relative positional relationship being a specific relationship estimating that the steering operation is to be performed in a direction in which the vehicle avoids the object, change the threshold value of the recording condition to a smaller value than a value when the relative positional relationship is not the specific relationship.

2. The vehicle-data recorder according to claim 1, wherein the second electronic control unit is configured to:
   recognize a lane line based on the image captured by the camera, the lane line defining a lane on which the vehicle is traveling; and
   determine that the relative positional relationship is the specific relationship and change the threshold value, in response to the relative positional relationship being: (i) a relationship in which an object-side distance that is a distance between the object and the lane line on which the vehicle is traveling is less than or equal to a set object-side distance, and (ii) at least one of (a) a relationship in which a vehicle-to-object distance between the object and the vehicle is less than or equal to a set vehicle-to-object distance and (b) a relationship in which the vehicle is approaching the object at a speed greater than or equal to a set speed.

3. The vehicle-data recorder according to claim 1, wherein the first electronic control unit is configured to:
   store the vehicle data into the memory when the relative positional relationship is not the specific relationship and when a first recording condition is satisfied, the first recording condition being that the steering-related value is greater than or equal to a first set steering-related value as the threshold value; and
   store the vehicle data into the memory when the relative positional relationship is the specific relationship and when a second recording condition is satisfied, the second recording condition being that the steering-related value is greater than or equal to a second set steering-related value as the threshold value, the second set steering-related value being less than the first set steering-related value.

4. The vehicle-data recorder according to claim 3, wherein at least one of the first set steering-related value and the second set steering-related value decreases as a speed of the vehicle increases.

5. The vehicle-data recorder according to claim 3, wherein:
   the vehicle includes an electric power steering device configured to support driving of the vehicle;
   the second recording condition is satisfied when the steering-related value is greater than or equal to the second set steering-related value and when a direction of a steering torque estimated to be applied to the vehicle by the electric power steering device based on the relative positional relationship between the object and the vehicle is reverse to a direction of a steering operation actually performed by the driver; and
   the first electronic control unit is configured to store the vehicle data into the memory when the second recording condition is satisfied.

6. The vehicle-data recorder according to claim 5, wherein:
   the second recording condition is satisfied when the steering-related value is greater than or equal to the second set steering-related value and when a state in which the direction of the steering torque estimated to be applied to the vehicle by the electric power steering device based on the relative positional relationship between the object and the vehicle is reverse to the direction of the steering operation actually performed by the driver has continued for a time greater than or equal to a determination time; and
   the first electronic control unit is configured to store the vehicle data into the memory when the second recording condition is satisfied.

7. The vehicle-data recorder according to claim 3, wherein:
   the memory is a non-volatile memory configured to store the vehicle data even when a main switch of the vehicle is in an OFF state;
   the vehicle-data recorder further comprises a volatile memory configured to temporarily store the vehicle data; and
   the first electronic control unit is configured to store the vehicle data into the volatile memory in a cycle of a particular time, and store the vehicle data stored in the volatile memory, into the non-volatile memory after a holding time is elapsed from satisfaction of the second recording condition.

8. A vehicle-data recorder comprising:
   a camera configured to capture object information relating to at least an object in an area surrounding a vehicle; and
   at least one electronic control unit connected to the camera, the at least one electronic control unit being configured to:
      identify the object located in the area based on an image captured by the camera, and obtain a relative positional relationship between the identified object and the vehicle; and
      record vehicle data into a memory in response to the relative positional relationship being a specific relationship estimating that a steering operation is to be performed in a direction in which the vehicle avoids the object.

* * * * *